United States Patent
Bissonnette et al.

(10) Patent No.: US 6,494,791 B1
(45) Date of Patent: *Dec. 17, 2002

(54) ELASTOMERIC COMPOSITIONS AND METHODS FOR MAKING SAME

(75) Inventors: Laurent C. Bissonnette, Portsmouth, RI (US); Antonio U. Desimas, East Providence, RI (US); Samuel A. Pasqua, Jr., Tiverton, RI (US)

(73) Assignee: Acushnet Company, Fairhaven, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/678,018

(22) Filed: Oct. 4, 2000

Related U.S. Application Data

(60) Continuation of application No. 09/293,982, filed on Apr. 19, 1999, now Pat. No. 6,172,161, which is a division of application No. 09/048,348, filed on Mar. 26, 1998, now Pat. No. 6,093,357.

(51) Int. Cl.$^7$ ............................................. A63B 37/00
(52) U.S. Cl. ........................ 473/351; 473/376; 525/193
(58) Field of Search ..................... 473/351; 525/193, 525/194, 177, 222, 236

(56) References Cited

U.S. PATENT DOCUMENTS

| | | | |
|---|---|---|---|
| 4,266,772 A | 5/1981 | Martin et al. | 525/193 |
| 4,625,964 A | 12/1986 | Yamada | 273/62 |
| 4,650,193 A | 3/1987 | Molitor et al. | 273/228 |
| 4,683,257 A | 7/1987 | Kakiuchi et al. | 525/193 |
| 4,688,801 A | 8/1987 | Reiter | 525/193 |
| 4,714,253 A | 12/1987 | Nakahara et al. | 273/228 |
| 4,781,383 A | 11/1988 | Kamada et al. | 273/228 |
| 4,848,770 A | 7/1989 | Shama | 273/228 |
| 4,863,167 A | 9/1989 | Matsuki et al. | 273/62 |

(List continued on next page.)

FOREIGN PATENT DOCUMENTS

| | | |
|---|---|---|
| AU | A-28623/97 | 1/1996 |
| GB | 2 299 518 A | 10/1996 |
| GB | 2 300 574 A | 11/1996 |
| GB | 2 302 035 A | 1/1997 |
| GB | 2 302 037 A | 1/1997 |
| JP | 51-49840 | 4/1976 |
| JP | 60-241463 | 11/1985 |
| JP | 64-80377 | 3/1989 |

OTHER PUBLICATIONS

Encyclopedia of Polymer Science and Engineering, vol. 12, Polyesters to Polypeptide Synthesis, pp. 84–86.
Hans–Georg Elias; Macromolecules 2 Synthesis, Materials, and Technology; Second Edition, 1984, p. 500.
The Condensed Chemical Dictionary, Tenth Edition, 1981, p. 902.

Primary Examiner—Steven Wong
Assistant Examiner—Raeann Gorden
(74) Attorney, Agent, or Firm—Swidler Berlin Shereff Friedman, LLP

(57) ABSTRACT

A multi-layer golf ball and methods for preparing a portion thereof including a core having at least one core layer, a mantle having at least one layer including an amount of reinforcing polymer component and a resilient polymer component disposed concentrically adjacent the core, and at least one cover layer disposed concentrically adjacent the mantle, wherein the layer of the mantle is sufficiently rigid to inhibit the resilient polymer component from substantially altering shape prior to crosslinking. The invention also includes an elastomeric composition including a polybutadiene having a high molecular weight average and a predominantly 1,4-cis content, a free-radical initiator, and a reinforcing polymer component having a sufficiently low viscosity at a mixing temperature to permit substantially uniform dispersion of the polymer component with the polybutadiene and having a crystalline melting point sufficiently low to permit mixing while avoiding substantial crosslinking.

28 Claims, 2 Drawing Sheets

U.S. PATENT DOCUMENTS

| | | | |
|---|---|---|---|
| 4,919,434 A | 4/1990 | Saito | 273/235 R |
| 4,979,746 A | 12/1990 | Gentiluomo | 273/220 |
| 5,002,281 A | 3/1991 | Nakahara et al. | 273/220 |
| 5,026,067 A | 6/1991 | Gentiluomo | 273/220 |
| 5,048,838 A | 9/1991 | Chikaraishi et al. | 273/228 |
| 5,072,944 A | 12/1991 | Nakahara et al. | 273/220 |
| 5,150,905 A | 9/1992 | Yuki et al. | 273/218 |
| 5,184,828 A | 2/1993 | Kim et al. | 273/228 |
| 5,253,871 A | 10/1993 | Viollaz | 273/228 |
| 5,255,922 A | 10/1993 | Proudfit | 525/193 |
| 5,273,287 A | 12/1993 | Molitor et al. | 273/232 |
| 5,314,187 A | 5/1994 | Proudfit | 273/235 R |
| 5,407,998 A | 4/1995 | Horiuchi et al. | 525/133 |
| 5,439,227 A | 8/1995 | Egashira et al. | 273/228 |
| 5,482,285 A | 1/1996 | Yabuki et al. | 273/228 |
| 5,490,674 A | 2/1996 | Hamada et al. | 273/228 |
| 5,538,794 A | 7/1996 | Cadorniga et al. | 473/378 |
| 5,553,852 A | 9/1996 | Higuchi et al. | 473/373 |
| 5,556,098 A | 9/1996 | Higuchi et al. | 473/373 |
| 5,601,502 A | 2/1997 | Hiraoka et al. | 473/373 |
| 5,681,898 A | 10/1997 | Pocklington | 525/193 |
| 5,683,312 A | 11/1997 | Boehm et al. | 473/354 |
| 5,688,191 A | 11/1997 | Cavallaro et al. | 473/373 |
| 5,738,597 A | 4/1998 | Sullivan et al. | 473/377 |
| 6,093,357 A * | 7/2000 | Bissonette et al. | 264/248 |
| 6,172,161 B1 * | 1/2002 | Bissonette et al. | 525/193 |

* cited by examiner

ELASTOMERIC COMPOSITIONS AND METHODS FOR MAKING SAME

This is a continuation of application Ser. No. 09/293,982, filed Apr. 19, 1999, now U.S. Pat. No. 6,172,161, which is a division of Ser. No. 09/048,384, filed Mar. 26, 1998, now U.S. Pat. No. 6,093,357.

FIELD OF THE INVENTION

The present invention relates to a multi-layer golf ball and methods for forming a portion thereof including a core having a center with at least one center layer, a mantle having at least one mantle layer including an amount of reinforcing polymer component and a resilient polymer component disposed concentrically adjacent the center, and at least one cover layer disposed concentrically adjacent the core, wherein the mantle or at least one layer of the mantle is sufficiently rigid to inhibit the resilient polymer component from substantially altering shape prior to crosslinking. The invention also relates to the polymeric composition used in forming the mantle.

BACKGROUND OF THE INVENTION

Multi-layer golf balls contain a core, which may include one or more layers of solid material or one or more layers of solid material encompassing a liquid therein, and a cover. Optionally, an elastic winding may also be used to form a layer surrounding the center to provide certain playing characteristics. Such balls are known as "wound" balls. The multi-layer golf balls discussed herein include a core and a cover. The terms "core" or "ball core," as used herein, include a center having one or more layers and a mantle formed of one or more layers. The terms "center" or "ball center," as used herein, include a solid and/or liquid mass around which at least a mantle and cover are placed. The mantle is disposed between the center and the cover, typically in concentric fashion, with the cover being the outermost portion of the ball.

A variety of golf ball compositions are known and used in various methods of manufacture. Unfortunately, these compositions and methods tend to produce balls that do not consistently achieve a symmetrical core. See, for example, the discussion in co-pending application Ser. No. 08/943, 932 by J. DALTON et al., which illustrates the poor centering that occurs in conventionally formed golf balls. This co-pending application is expressly incorporated herein by reference thereto for this purpose. Multi-layer ball production has been plagued by center portions that become off-centered during the manufacture of such balls. Off-center golf balls are a hindrance to many players, particularly those able to achieve great control using a symmetrical ball. This lack of symmetry is now believed to be caused, at least in part, by the materials and methods conventionally used in forming multi-layer golf balls. A number of these conventional multi-layer ball compositions are discussed below.

U.S. Pat. No. 4,781,383 discloses a solid three-piece golf ball made by covering a core, which has inner and outer layers, with a shell. The outer layer of cis-1,4-polybutadiene, zinc diacrylate, and zinc oxide is prepared by using a metal mold to prepare two hemispherical premolded products, which are used to cover the previously molded inner layer of the core. The outer layer is then cured around the inner layer by heating the entire core before adding the shell.

U.S. Pat. No. 4,919,434 discloses a two-piece golf ball having a solid core of more than 40% cis-1,4-polybutadiene and a cover having an inner layer of 0.1 to 2 mm thickness and an outer layer of 0.1 to 1.5 mm thickness. The inner layer is a thermoplastic resin, such as an ionomer, polyester elastomer, polyamide elastomer, thermoplastic urethane elastomer, propylene-butadiene copolymer, 1,2-polybutadiene, polybutene-1, and styrene-butadiene block copolymer, either individually or in combination.

U.S. Pat. No. 5,150,905 discloses a rubber composition usable in golf balls having at least one natural or synthetic rubber component, inorganic fibers subjected to surface treatment, and a non-sulfur type vulcanizing agent. The rubber may include known additives, such as organic modifiers of various resins like cumarone-indene, phenol, polystyrene, acrylic, polyamide, epoxy, urethane, polyolefin, and similar resins. The rubber may also include long fiber reinforcing material, such as fibers of glass, carbon, metal, quartz, ceramic, nylon, vinyl, polyester, aromatic polyamide, polyimide, and aromatic polyether amide.

U.S. Pat. No. 5,253,871 discloses a three-part golf ball including an elastomer core, an intermediate layer of a thermoplastic material containing at least 10%, preferably at least 35%, of ether block copolymer, and a thermoplastic envelope. The other copolymer of the intermediate layer is disclosed to be one or more ionomers.

U.S. Pat. No. 5,314,187 discloses a golf ball having a core, as well as a cover having an inner layer of a cut-resistant material such as an ionomer resin and an outer layer of natural or synthetic balata and one or more thermally crosslinkable elastomeric polymers.

U.S. Pat. No. 5,439,227 discloses a multi-piece solid golf ball having a solid core with an inner layer of a rubber and an outer layer of 100–50 wt % of a polyether ester type thermoplastic elastomer having a $T_g$ of up to −25° C. and 0–50 wt % of an ethylene-(meth)acrylate copolymer ionomer, and a cover of ethylene-(meth)acrylate copolymer ionomer.

U.S. Pat. Nos. 5,553,852 and 5,556,098 disclose a three-piece solid golf ball with a conventional rubber center core, an intermediate layer of thermoplastic elastomer or thermoplastic elastomer and ionomer resin mixture, and a cover typically of an ionomer resin, each portion having a particular hardness and thickness.

U.S. Pat. No. 5,601,502 discloses a three-piece solid golf ball including a core of a center having an α,β-unsaturated carboxylic acid metallic salt in an amount of 13 to 28 parts by weight based on 100 parts by weight of base rubber and an outer shell having an α,β-unsaturated carboxylic acid metallic salt in an amount of 28 to 35 parts by weight based on 100 parts by weight of base rubber. The base rubber preferably has a cis-1,4 structure of 40% or more, particularly 85% or more.

U.S. Pat. No. 5,681,898 discloses a golf ball having a solid core and a cover, with an intermediate layer including a first component of an uncrosslinked blend of n-butyl acrylate and ethylene methacrylic acid copolymer, which is sold under the name NUCREL, and a second component of a vulcanizate formed from polybutadiene and a peroxide curing agent. The vulcanizate is ground to a fine powder and then conventionally mixed with pellets of the NUCREL and melted for injection molding.

U.S. Pat. No. 5,683,312 discloses a golf ball having a fluid mass at the center, a first non-wound mantle layer of a thermoset rubber material, thermoplastic elastomeric material and plastic, a second non-wound mantle layer of a thermoset rubber material or thermoplastic elastomeric material, and a cover.

U.S. Pat. No. 5,688,191 discloses a multi-layer golf ball having a core with one or more layers, at least one cover layer, and one or more mantle layers disposed therebetween, wherein the mantle layer includes dynamically vulcanized thermoplastic elastomer, functionalized styrene-butadiene elastomer, thermoplastic polyurethane, metallocene polymer or blends thereof, and thermoset materials.

It is desirable to use thermoset material-containing hemispherical shells to form one or more mantle layers about a golf ball center, although this often results in poor centering of the mantle and other difficulties because thermoset materials are difficult to work with before they have been crosslinked. The polymers typically used in such shells tend to have a memory that urges the polymer back to its earlier or original shape, which necessitates rapid compression molding to crosslink the polymer as soon as the shells are formed. Hemispherical shells are also prone to trapping air in the apex of the mold cavities in which they are placed to assemble golf ball cores. Hemispherical shells also do not tend to readily fit within mold cavities having off-center parting lines, which also causes problems due to poor centering when forming is golf ball cores.

There is thus a need for an improved composition and method for manufacturing golf balls that avoids the disadvantages present when using thermoset material-containing hemispherical shells to form one or more mantle layers about a center. A new composition for one or more layers of a golf ball mantle, and a method for manufacturing a portion of a golf ball core using ellipsoidal shells around a center, advantageously improves the symmetrical formation of the core in golf balls in accordance with the present invention. The proposed compositions facilitate injection molding of the uncrosslinked shells and permit automated assembly, which greatly reduces production costs.

SUMMARY OF THE INVENTION

The present invention relates to a method of forming at least a portion of a golf ball core by mixing a resilient polymer component, a free-radical initiator, a crosslinking agent, and a reinforcing polymer component to provide an uncrosslinked first mixture having a rigidity measured by a flexural modulus of greater than about 3.5 MPa, wherein the mixing occurs at a temperature greater than the melting temperature but sufficiently lower than the crosslinking temperature of the reinforcing polymer component so as to substantially inhibit initiation of crosslinking, forming the first mixture into a plurality of shells in a desired shape, wherein the reinforcing polymer component imparts sufficient rigidity to the shells to maintain the desired shape until the first mixture is crosslinked, providing a center, assembling at least two shells concentrically about the center to form a first mantle layer, wherein the first mantle layer and center together form the ball core, and applying sufficient heat and pressure to the core as it is constrained within a rigid cavity for a time sufficient to at least partially crosslink the first mixture in the shells, thereby curing at least a portion of the golf ball core. In a preferred embodiment, the first mixture is formed into ellipsoidal shells.

In one embodiment, the method includes selecting the resilient polymer component to have a molecular weight average of between about 50,000 to 1,000,000. In another embodiment, the reinforcing polymer component is generally selected to have a crystalline melting temperature between 35° C. and 120° C. In another embodiment, the first mixture is formed into a plurality of shells by injection molding. These shells are preferably ellipsoidal in shape. In yet another embodiment, the desired ellipsoidal shells are formed by compression molding the first mixture.

In a further embodiment, the ball core has a midpoint and the center of the core is disposed within about 0.5 mm from the midpoint. In another embodiment, the uncrosslinked first mixture used to form the mantle has a flexural modulus that is at least about 7 MPa prior to cure. In yet another embodiment, the loss tangent of the crosslinked mantle material first mixture is adjusted to less than about 0.15 at −60° C. and less than about 0.05 at 30° C. at 1 Hz and 1 percent strain. In another embodiment, the dynamic modulus, used herein to mean the tensile storage modulus (E'), of the crosslinked first mixture is greater than about 100 MPa at −60° C. and greater than about 50 MPa at 30° C., also at 1 Hz and 1 percent strain.

In another embodiment, the melting temperature and the crosslinking temperature are selected to differ by about 60° C. to 160° C. In yet another embodiment, the core is selected to include a center surrounded by elastic windings, a solid center, or a liquid center. In another embodiment, at least one additional layer is formed about the center prior to assembling the shells concentrically about the center, after assembling the shells concentrically about the center, or after heating the core. In a preferred embodiment, at least one additional layer is formed around the core after heating the core to provide a cover disposed concentrically about the golf ball core.

The invention also relates to elastomeric compositions including a resilient polymer component of at least one polybutadiene having a high molecular weight average and a 1,4-cis content of greater than about 50 weight percent, a free-radical initiator, and an amount of reinforcing polymer component having a sufficiently low viscosity at a mixing temperature to facilitate mixing of the reinforcing polymer component with the resilient polymer component and having a crystalline melting point sufficiently low to facilitate mixing while avoiding substantial crosslinking, wherein the uncrosslinked composition has a flexural modulus of greater than about 3.5 MPa.

In one embodiment, the composition further includes a crosslinking agent in an amount sufficient to increase crosslinking between the polymer components. The invention also relates to an ellipsoidal article formed of the composition.

In another embodiment, the resilient polymer component has a molecular weight from about 50,000 to 1,000,000. In a preferred embodiment, the molecular weight average of the resilient polymer component is from about 250,000 to 750,000.

In a further embodiment, the free-radical initiator is an organic peroxide. In another embodiment, the reinforcing polymer component includes a block copolymer ether/ester, an acrylic polyol, a transpolyisoprene, a transpolybutadiene, a 1,2-polybutadiene, an ethylene-vinyl acetate copolymer, or a cyclooctene. In yet another embodiment, the composition also includes a crosslinking agent of a metallic salt selected from the group of an unsaturated fatty acid, a monocarboxylic acid, and mixtures thereof. In another embodiment, the reinforcing polymer component is present in an amount of about 1 to 40 weight percent of the resilient and reinforcing polymer components.

The invention also relates to a multi-layer golf ball having a core including a center, a mantle having at least one layer, the layer having a blend of a reinforcing polymer component and a resilient polymer component crosslinked and disposed concentrically adjacent the center, and at least one cover layer disposed concentrically adjacent the mantle and outwardly thereof, wherein the uncrosslinked mantle layer is sufficiently rigid to inhibit the resilient polymer component from substantially altering shape prior to crosslinking.

In another embodiment, the resilient polymer component and the core each include polybutadiene, natural rubber, polyisoprene, styrene-butadiene, or styrene-propylene-diene rubber, or mixtures thereof. In a preferred embodiment, the resilient Polymer component is 1,4-cis-polybutadiene having a 1,4-cis content of greater than about 50 weight percent. In a preferred embodiment, the 1,4-cis Content is greater than about 90 weight percent.

In still another embodiment, the amount of resilient polymer component is between about 60 to 99 weight percent of the polymer components. In a preferred embodiment, the amount of resilient polymer component present is from about 75 to 90 weight percent of the Polymer components. In another embodiment, the golf ball core further includes at least one of a filler, a free-radical initiator, or a crosslinking agent. In one preferred embodiment, filler is present and includes masterbatch red, zinc oxide, tin oxide, barium sulfate, zinc sulfate, calcium carbonate, barium carbonate, clay, tungsten, tungsten carbide, a silica, or cured ground rubber trimethyl-tripropane, or mixtures thereof, present in an amount from about 0.5 to 50 weight percent of the mantle. In another preferred embodiment, the free-radical initiator is an organic peroxide. In another preferred embodiment, the cross-linking agent includes a metallic salt selected from the group of an unsaturated fatty acid, a monocarboxylic acid, and mixtures thereof. In another embodiment, the uncrosslinked mantle layer has a flexural modulus of greater than about 3.5 MPa.

BRIEF DESCRIPTION OF THE DRAWINGS

Further features and advantages of the invention can be ascertained from the following detailed description which is provided in connection with the attached drawings, wherein.

DETAILED DESCRIPTION OF THE INVENTION

Figure 1:
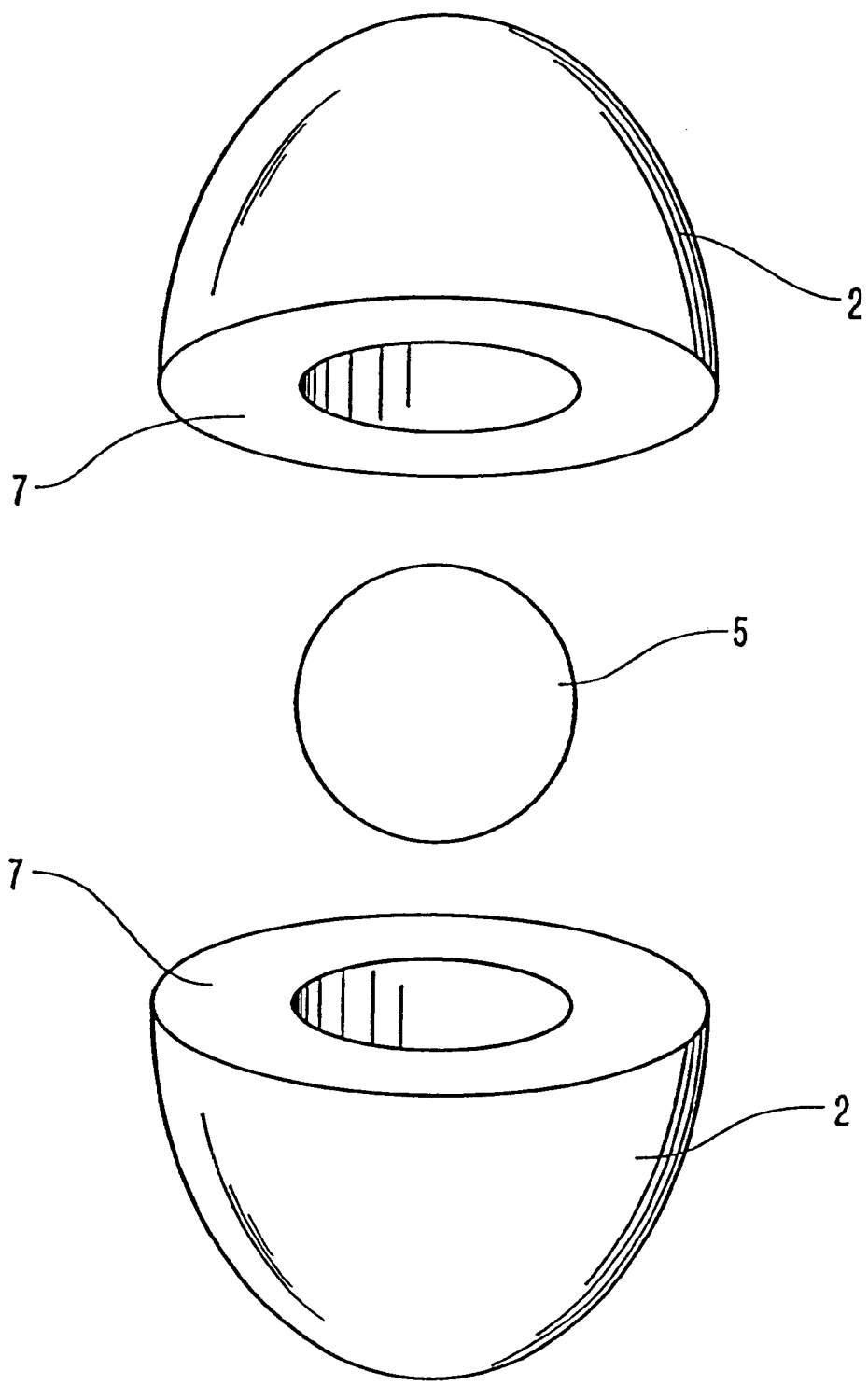
FIG. 1 illustrates two semi-ellipsoidal shells being assembled about a center according to the invention.

Resilient polymer components, such as polybutadiene, typically have a "memory" that forces reshaped components to attempt to return to their original or previous shape. It has now been discovered that the addition of a reinforcing polymer component to the resilient polymer component imparts reinforcement that inhibits or prevents the resilient polymer from relaxing to an earlier or original position that may result in formation of an off-center ball during further processing. The reinforcing polymer component imparts geometrical stability to the uncrosslinked material used to form the mantle, at least in part by inhibiting shifting of the mantle during assembly about the center.

The center of the ball is typically and preferably spherical, may be solid or liquid-filled, and is generally about 0.5 inches to 1.5 inches, preferably about 0.8 inches to 1.3 inches, and more preferably about 1 to 1.2 inches in diameter. It is envisioned that an elastic strip may be wound around the center and before the mantle is added, although it is preferred that the mantle be placed around the center without intervening layers. The mantle should have a thickness of about 0.1 to 0.6 inches, preferably about 0.15 to 0.35 inches, more preferably about 0.2 to 0.3 inches. The entire core, including the center and mantle, should have a diameter of about 1.25 to 1.65 inches, preferably 1.38 to 1.6 inches, where twice the mantle thickness is included in the core diameter since the mantle encloses the center. The diameter of the mantle corresponding to a particular center, and of the cover formed around the mantle and center, may be adjusted according to the diameter of the center to provide a golf ball formed according to the invention with the overall minimum diameter required by the USGA. The mantle should be thick enough to form the core when molded over the center. The minimum mantle thickness is readily determined by one of ordinary skill in the art, and depends upon the specific materials used to form the mantle. One example of a preferred ball center size according to the invention is a center having a diameter of 1.08 inches and a mantle having a thickness of 0.25 inches to provide a core having a 1.58 inch diameter.

The present invention includes a novel composition and method of making a ball and a portion of a ball, and the ball and ball portions thereby produced, to advantageously improve the centering of the mantle relative to the center of a ball. Improved centering of the mantle about the center results in a more symmetrical ball core. Although the methods and compositions of the invention are suitable for making other types of balls, they are best used for golf balls. The composition of the invention is advantageously used in forming a plurality of shells that are assembled about a center and that form at least one layer of the mantle. The shells and resultant mantle include a reinforcing polymer component, a resilient polymer component, a free-radical initiator, and optionally one or more of a crosslinking agent and fillers.

The composition and method of the invention offer significant advantages over the prior art. For example, the invention permits air in the apex of the mold cavities to be more easily removed, permits the shells to be formed by injection molding and to more readily fit within mold cavities having off-center parting lines, and provides improved centering of the mantle about the center when forming golf ball cores.

The shells, and resultant mantle, for use in a ball core include a resilient polymer component, which is used as the majority of polymer in the composition and method. Resilient polymers suitable for use in the ball core include polybutadiene, polyisoprene, styrene-butadiene, styrene-propylene-diene rubber ethylene-propylenediene (EPDM), mixtures thereof, and the like. The resilient polymer component is preferably polyisoprene or polybutadiene ("PBD"), more preferably polybutadiene, and most preferably a 1,4-cis-polybutadiene. One example of a 1,4-cis-polybutadiene is CARIFLEX BR 1220, commercially available from H. MUEHLSTEIN & CO., INC. of Norwalk, Conn. The polybutadiene or other resilient polymer component may be produced with any suitable catalyst that results in a predominantly 1,4-cis content, and preferably with a catalyst that provides a high 1,4-cis content and a high molecular weight average. The resilient polymer component has a high molecular weight average, defined as being at least about 50,000 to 1,000,000, preferably from about 250,000 to 750,000, and more preferably from about 200,000 to 325,000. CARIFLEX BR 1220 has a molecular weight average of about 220,000. The 1,4-cis component of polybutadiene is generally the predominant portion of the resilient polymer component when polybutadiene is present. "Predominant" or "predominantly" is used herein to mean greater than 50 weight percent. The 1,4-cis component is preferably greater than about 90 weight percent, and more preferably greater than about 95 weight percent, of the polybutadiene component. The resilient polymer component is typically present in an amount of at least about 60 weight percent, preferably about 65 to 99 weight percent, and more preferably about 75 to 90 weight percent of the polymer blend. The term "polymer blend" is used herein to mean the blend of the resilient polymer component and the reinforcing polymer component. The resilient polymer component imparts resilience to the core or mantle in the cured, or crosslinked, state.

The mantle also includes a reinforcing polymer component, which contains at least one polymer having a glass transition temperature sufficiently low to permit combination and mixing of the reinforcing polymer component with the resilient polymer component without initiating crosslinking of the crosslinking agent that is also typically present in the mixture, as described below. The reinforcing polymer component should have a sufficiently low viscosity at the mixing temperature when mixed with the resilient polymer component to permit proper mixing of the two polymer components. The reinforcing polymer component also typically has a glass transition temperature (and if crystalline, a crystalline melting point) sufficiently low to permit mixing with the resilient polymer component while avoiding substantial crosslinking or thermal degradation of the resilient component at the mixing temperature. The crystalline melting temperature is typically between about 35° C. to 120° C. Examples of polymers suitable for use as the reinforcing polymer component include: transpolyisoprene, block copolymer ether/ester, acrylic polyol, a polyethylene, a polyethylene copolymer, 1,2-polybutadiene (syndiotactic), ethylene-vinyl acetate copolymer, cyclooctene, trans-polybutadiene, and mixtures thereof. Particularly suitable reinforcing polymers include: HYTREL 3078, a block copolymer ether/ester commercially available from DuPont of Wilmington, Del.; a transpolybutadiene, such as FUREN 88 obtained from Asahi Chemicals of Yako, Kawasakiku, Kawasakishi, Japan; KURARAY TP251, a transpolyisoprene commercially available from KURRARAY CO. of New York, N.Y. as KURARAY AMERICA CO.; LEVAPREN 700HV, an ethylene-vinyl acetate copolymer commercially available from Bayer-Rubber Division, Akron, Ohio; and VESTENAMER 8012, a cyclooctene commercially available from Huls America Inc. of Tallmadge, Ohio. Some suitable reinforcing polymer components are listed below with their crystalline melting points and/or $T_g$.

| Polymer Type | Tradename | Crystalline Melt Temperature (° C.) | $T_g$ (° C.) |
| --- | --- | --- | --- |
| Transpolyisoprene | KURARAY TP251 | 60 | −59 |
| Transpolybutadiene | FUREN 88 | 84 | −88 |
| Polyethylene | Dow LPDE | 98 | −25 |
| Polyoctene | VESTENAMER 8012 | 54 | −65 |

The reinforcing polymer component must be present in an amount sufficient to impart rigidity to the shells during processing, yet not undesirably reduce resilience of the crosslinked polymer blend and thereby have an undesirable effect on the final product. Also, the reinforcing polymer component, i.e., the additive polymer component, must have a viscosity sufficiently low to permit mixing of the reinforcing polymer component and the resilient polymer component. For example, transpolyisoprene has a viscosity of less than 1,000,000 poise at a mixing temperature of around 82° C. The viscosity of materials suitable for use in the invention may be readily determined by one of ordinary skill in the art. The viscosity should generally be below about 1,000,000 poise to readily permit mixing. When transpolyisoprene is used as the reinforcing polymer component, it is typically present in an amount of about 10 to 40 weight percent, preferably about 15 to 30 weight percent, of the polymer blend. The weight of the reinforcing polymer relative to the total composition generally ranges from about 5 to 25 weight percent, preferably about 10 to 15 weight percent. The uncrosslinked mantle should have a flexural modulus, as measured under ASTM D790M-93, Method II, of greater than about 3.5 MPa, and preferably greater than about 7 MPa. The reinforcing polymer components imparts a degree of rigidity to the shells sufficient to maintain the desired shape until the first mixture is crosslinked.

Suitable crosslinking agents include one or more metallic salts of unsaturated fatty acids or monocarboxylic acids, such as zinc, calcium, or magnesium acrylate salts, and the like. Preferred acrylates include zinc acrylate, zinc diacrylate, and zinc methacrylate. The crosslinking agent must be present in an amount sufficient to crosslink the various chains of polymers in the polymer blend to themselves and to each other. The desired elastic modulus for the mantle may be obtained by adjusting the amount of crosslinking by selecting a particular type or amount of crosslinking agent. This may be achieved, for example, by altering the type and amount of crosslinking agent, which method is well known to those of ordinary skill in the art. The crosslinking agent is typically added in an amount from about 1 to 50 parts per hundred of the polymer blend, preferably about 20 to 45 parts per hundred, and more preferably about 30 to 40 parts per hundred, of the polymer blend.

Although not required, a free-radical initiator is preferably included in the composition and method. The free-radical initiator may be any compound or combination of compounds present in an amount sufficient to initiate a crosslinking reaction between a crosslinking agent and the reinforcing and resilient polymer components of the polymer blend. The free-radical initiator is preferably a peroxide. Suitable free-radical initiators include di(2-t-butyl-peroxyisopropyl)benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,bis(t-butylperoxy)valerate on calcium silicate, lauroyl peroxide, benzoyl peroxide, t-butyl hydroperoxide, and the like. The free-radical initiator is preferably present in an amount of up to 2 parts per hundred, more preferably about 0.2 to 1 parts per hundred of the polymer blend.

The resilient polymer component, reinforcing polymer component, free-radical initiator, and any other materials used in forming the golf ball core in accordance with invention may be combined by any type of mixing known to one of ordinary skill in the art. A suitable system, for example, would include transpolyisoprene, which melts at around 60° C., as the reinforcing component and a dicumyl peroxide, which substantially initiates reaction at around 170° C., as the free radical initiator. Suitable types of mixing include single pass and multi-pass mixing, and the like. The optional crosslinking agent, and any other optional additives used to modify the characteristics of the golf ball center, may similarly be combined by any type of mixing. A single-pass mixing process where ingredients are added sequentially is preferred, as this type of mixing tends to increase efficiency and reduce costs for the process. Suitable mixing equipment is well known to those of ordinary skill in the art, and such equipment may include a Banbury mixer or a twin screw extruder. Conventional mixing speeds for combining polymers are typically used, although the speed must be high enough to impart substantially uniform dispersion of the resilient and reinforcing polymer components. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the resilient polymer component. Also, too high a mixing speed may undesirably result in creation of enough heat to initiate the crosslinking before the preforms are shaped and assembled around a core. The mixing temperature depends upon the type of resilient and reinforcing polymer components, and more importantly, on the type of free-radical initiator. The mixing temperature must be higher than the melting temperature of the reinforcing polymer component, but not so high as to initiate substantial crosslinking. For example, when using di(2-t-butyl-peroxyisopropyl)benzene peroxide as the free-radical initiator, a mixing temperature of about 80° C. to 125° C., preferably about 88° C. to 110° C., and more preferably about 90° C. to 100° C. is suitable to safely mix the ingredients. The mixing speed and temperature are readily determinable by one of ordinary skill in the art without undue experimentation.

Fillers are typically also added to the composition used in the shells of the mantle, the center, or both ball portions, to increase the density of the core to conform to uniform golf ball standards. Fillers may also be used to modify the weight of the core for specialty balls used by players, e.g., a lower weight core is preferred for a player having a low swing speed. Fillers typically include processing aids or compounds to affect Theological and mixing properties, the specific gravity, the modulus, the tear strength, reinforcement, and the like. The fillers are generally inorganic, and suitable fillers include numerous metals and metal oxides, such as zinc oxide and tin oxide, and barium sulfate, zinc sulfate, calcium carbonate, barium carbonate, clay, tungsten, tungsten carbide, an array of silicas, cured ground rubber trimethyl-tripropane, and the like. The fillers, when used, may be present in an amount of about 0.5 to 50 weight percent of the composition.

Any conventional material or method may be used in preparing the golf ball cover disposed over the core. For example, as is well known in the art, ionomers, balata, and urethanes are suitable golf ball cover materials. A variety of less conventional materials may also be used for the cover, e.g., thermoplastics such as ethylene- or propylene-based homopolymers and copolymers. These homopolymers and copolymers may also include functional monomers such as acrylic and methacrylic acid, fully or partially neutralized ionomers and their blends, methyl acrylate, methyl methacrylate homopolymers and copolymers, imidized amino group-containing polymers, polycarbonate, reinforced polycarbonate, reinforced polyamides, polyphenylene oxide, high impact polystyrene, polyether ketone, polysulfone, poly(phenylene sulfide), acrylonitrile-butadiene, acrylic-styrene-terephthalate, poly(ethylene terephthalate), poly(butylene terephthalate), poly(ethylene-vinyl alcohol), poly(tetrafluoroethylene), and the like. Any of these polymers or copolymers may be further reinforced by blending with a wide range of fillers, including glass fibers or spheres, or wood pulp. The selection of a suitable cover, and application thereof over the mantle described herein, will be readily determinable by those of ordinary skill in the art when considering the disclosure herein.

The golf balls of the present invention, or portions thereof, are prepared as follows. A solid spherical center including one or more of the resilient polymer components described herein is prepared by at least one of conventional compression, injection molding, or winding techniques. A liquid-filled center may alternatively be formed instead of a solid center. Any additionally desired center layers may then be added to the center by conventional compression or injection molding techniques, preferably in a concentric fashion to maintain a substantially spherical center.

The mantle preforms may be prepared as ellipsoidal or hemispherical half-shells using conventional compression or injection molding techniques. The preferred method is to prepare two ellipsoidal half-shells that fit around the core and merge to form the mantle, or one or more layers thereof. The ellipsoidal half-shells, also known as preps or preforms, preferably have a minor axis of 0.9 to 0.98 times and a major axis of 1 to 1.5 times, preferably 1.02 to 1.1 times the mold cavity diameter when two half-shells are combined to form a mantle. The major and minor axes are measurements of the combination of two adjacent half-shells assembled about a center. The major and minor axes have different sizes due to the ellipsoidal shape of pairs of preforms, and if a pair of preforms were spherical the major and minor axes would be the same size and would each be equal to a diameter of the sphere formed by the two preforms. The ellipsoidal preforms thus have thicker crowns at their top and bottom and a thinner equator, i.e., ellipsoidal in shape, than a conventional spherical mantle which would have a constant diameter at any orientation.

The preforms are prepared by mixing the resilient polymer component, the reinforcing polymer component, and any other ingredients together as discussed above. The resulting geometrical stability provides additional time for processing between preform formation and curing via compression molding. This additional time may be used to improve manufacturability, optimize production scheduling, and the like, such as by preparation and stockpiling of rigid shells to facilitate molding machine shut down for maintenance or tool changes. With enough shells stockpiled, further golf ball manufacture could be carried out even while the preform injection machine is being retooled. The mixture of polymer components, free-radical initiator, optionally a crosslinking agent, and any fillers may be extruded or pelletized for introduction into a molding machine for preparation of the mantle.

The ellipsoidal half-shells are preferably injection molded from the mixture based on cost and speed considerations, although compression molding is also suitable. The mold is preferably maintained at a temperature below the crystalline melting temperature of the reinforced polymer component to inhibit the formed shells from altering shape due to the memory of the resilient polymer component.

After their formation, the ellipsoidal half-shells are assembled about the core. In accordance with the invention, the shells may be produced rapidly with injection molding. The rapid production of shells permits use of automated procedures for assembly about the center. During assembly about the center, the ellipsoidal half-shells self-orient themselves vertically when placed in hemispherical mold cups, which reduces preparation time, cost, and defects. The ellipsoidal shells inhibit formation of air cavities at the apex due to their having more material at the crown of the shell, thereby facilitating the expulsion of any trapped air out of the mold at the equator of the core where the two mold halves are typically combined for the molding of the mantle about the center. The assembly of the core, i.e., typically two half-shell preforms and a center, may be compression molded. When the mold halves are combined, they form a rigid, spherical cavity. Once the mold is closed, the excess material from the shell crowns is forced out of the mold cavity at the equator where the mold halves combine. The compression molding of the assembled preforms and center tends to take about 5 to 40 minutes, although times may vary depending upon the materials used. For example, a typical compression molding cycle may take 12 minutes at around 174° C. The shells are forced together by the mold and substantially cured during molding. Optionally, if additional mantle layers are desired, e.g., having different characteristics to improve or modify the overall ball qualities, they may be provided over the first mantle layer. Additional mantle layers are preferably added after the previous mantle layer is cured, although they may be added before cure of the previous layer if the pre-cured mantle layer is rigid enough so that substantially no mixing of the layers occurs.

Balls prepared according to the invention with a reinforcing polymer component in the mantle tend to exhibit substantially the same resilience, or coefficient of restitution, as balls with conventional mantles. Another measure of this resilience is the "loss tangent," or tan δ, which is obtained by measuring the dynamic visco-elasticity of an object. Thus, a lower loss tangent indicates a higher resiliency, thereby indicating a higher rebound capacity. Loss tangent and a variety of other dynamic properties may be measured according to ASTM D4065-90, and terminology relating to such dynamic properties is typically described according to ASTM D4092-90. Low loss tangent indicates that most of the energy imparted to a golf ball from the club is converted to dynamic energy, i.e., launch velocity and resulting longer distance. The desired loss tangent in the crosslinked mantle material should be less than about 0.15 at −60° C. and less than about 0.05 at 30° C. when measured at a frequency of 1 Hz and a one percent strain. The rigidity or compressive stiffness of a golf ball may be measured, for example, by the dynamic modulus. A higher dynamic modulus indicates a higher compressive stiffness. To produce golf balls having a desirable compressive stiffness, and therefore a suitable "feel" to the player, the dynamic modulus of the crosslinked mantle material should be greater than about 100 MPa at −60° C. and greater than about 50 MPa at 30° C. measured at 1 Hz and one percent strain.

FIG. 1 illustrates semi-ellipsoidal shells 2 being assembled about a golf ball center 5 according to the invention. The shells are joined at the equator 7.

Figure 2:
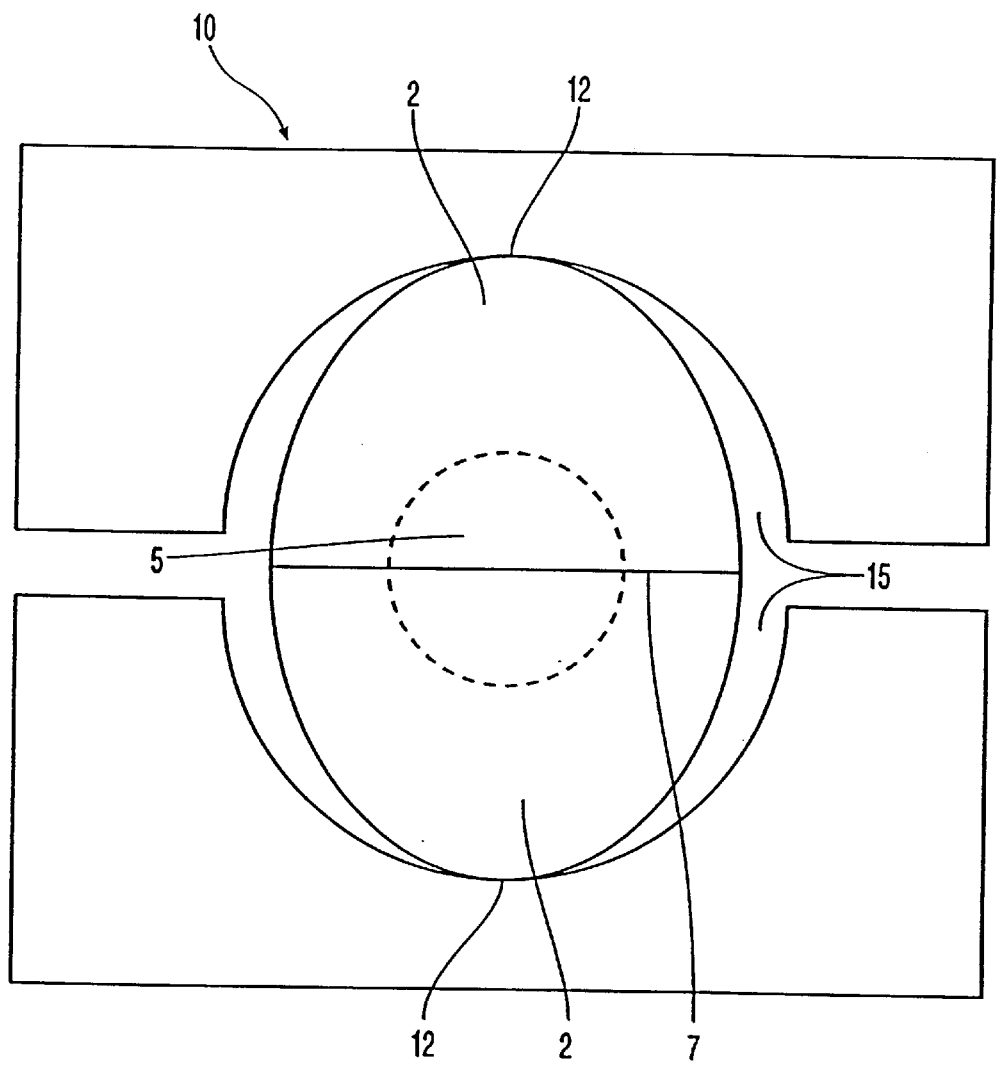
FIG. 2 illustrates a view of two shells having exaggerated-scale semi-ellipsoidal shapes being assembled about a center, and located within a mold cavity, according to the invention.

FIG. 2 illustrates an exaggerated-scale view of two shells 2 having semi-ellipsoidal shapes according to the invention being assembled about a center 5 in a compression molding device 10. The molding device preferably contains a hemispherical, concave chamber 15 to form half of the core. The equator 7 of the two shells is depicted, showing where the two semi-ellipsoidal shells 2 contact each other about the center 5. The apex 12 of the shells 2 contains additional material relative to the side portions by the mutual equator 7 of the shells 2. When the mold 10 is closed and heated, the two hemispherical, concave chambers 15 together form a spherical chamber to provide a final substantially spherical shape to the core. Excess material from the semi-ellipsoidal shells 2 flows out of the chamber at the interface between the mold halves, i.e., at the equator 7, resulting in a final center that is crosslinked and substantially spherical.

The resulting ball, after a suitable cover is applied by conventional techniques, exhibits improved characteristics such as the low spin and high coefficient of restitution desired by the vast majority of golf players. The semi-rigid ellipsoidal shells, as a result of combining the reinforcing polymer component and resilient polymer component, have a substantially improved concentricity of the mantle in relation to the core, and require less labor to produce. For example, the center of a ball core prepared according to the invention is typically no more than about 0.5 mm from the center of the cured golf ball. One of ordinary skill in the art of golf ball manufacture, as well as the typical player, will readily recognize that more accurate centering of the ball results in more consistent results and an improved game.

Figure 3:
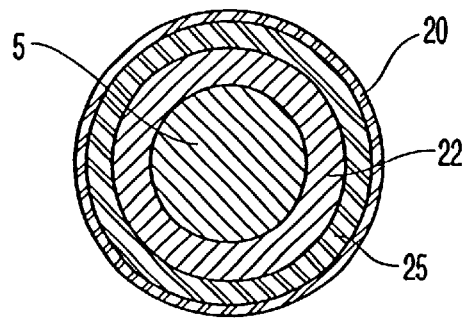
FIG. 3 illustrates a multilayer golf ball having a center, a mantle with several layers, and a cover according to the invention.

Similarly, FIG. 3 illustrates a multi-layer solid golf ball with a cover 20 and a core with a mantle assembled about a center 5 according to the invention. In this embodiment, the mantle includes two mantle layers 22 and 25 according to the invention.

EXAMPLES

The following examples are provided only for the purpose of illustrating the invention and are not to be construed as limiting the invention in any manner.

Examples 1–9
Exemplary Mantle Compositions

Sample mantle compounds were prepared and mixed according to the techniques described herein. The following mantle formulations 1–9 were prepared:

| Component | Ex. 1 PHR/wt % | Ex. 2 PHR/wt % | Ex. 3 PHR/wt % | Ex. 4 PHR/wt % | Ex. 5 PHR/wt % | Ex. 6 PHR/wt % | Ex. 7 PHR/wt % | Ex. 8 PHR/wt % | Ex. 9 PHR/wt % |
|---|---|---|---|---|---|---|---|---|---|
| Zinc diacrylate | 38/23.8 | 34/21.7 | 30/19.4 | 26/17.1 | 22/14.7 | 24/15.7 | 20/13.4 | 16/10.9 | 12/8.3 |
| Zinc oxide | 21/13.1 | 22/14 | 24/15.5 | 25/16.5 | 27/18 | 28/18.3 | 29/19.4 | 30/20.4 | 32/22.1 |
| Transpolyisoprene (Reinforcing Comp.) | 20/12.5 | 20/12.8 | 20/12.9 | 20/13.2 | 20/13.4 | 0/0 | 0/0 | 0/0 | 0/0 |
| High MW 1,4-cis-PBD | 80/50.1 | 80/51 | 80/51.7 | 80/52.7 | 80/53.4 | 100/65.4 | 100/66.8 | 100/68.1 | 100/69.1 |
| 1,1-bis(t-butylperoxy)-3,3,5-trimehtylcyclohexane | 0.42/0.26 | 0.42/0.27 | 0.42/0.27 | 0.42/0.28 | 0.42/0.28 | 0.42/0.27 | 0.42/0.28 | 0.42/0.29 | 0.42/0.29 |
| di(2-t-butyl-peroxyisopropyl) | 0.15/0.09 | 0.15/0.1 | 0.15/0.1 | 0.15/0.1 | 0.15/0.1 | 0.15/0.1 | 0.15/0.1 | 0.15/0.1 | 0.15/0.1 |

-continued

| Component | Ex. 1 PHR/wt % | Ex. 2 PHR/wt % | Ex. 3 PHR/wt % | Ex. 4 PHR/wt % | Ex. 5 PHR/wt % | Ex. 6 PHR/wt % | Ex. 7 PHR/wt % | Ex. 8 PHR/wt % | Ex. 9 PHR/wt % |
|---|---|---|---|---|---|---|---|---|---|
| benzene Color masterbatch | 0.25/0.16 | 0.25/0.16 | 0.25/0.16 | 0.25/0.16 | 0.25/0.17 | 0.25/0.16 | 0.25/0.17 | 0.25/0.17 | 0.25/0.17 |

PHR is parts per hundred.
Color masterbatch is a filler that simply provides a colored composition.
Examples 6–9 are exemplary center compositions used with mantles of the invention.

The formulations described in Examples 1–5 above are but a few examples of compositions usable in the method of the present invention to form a mantle layer in a golf ball that exhibits improved centering. Examples 6–9 are sample formulations for conventional golf ball centers.

Examples 10–12
Flexural Modulus of Mantles Prepared According to the Invention

A flex bar specimen having the dimensions 3/16"×1/2"×4" was produced by compression molding uncrosslinked mantle material. The flexural modulus of uncrosslinked mantles prepared according to the invention was measured using ASTM Method D790M-93, Method II, with a loading rate of 0.5 in/min.

| Example # | Reinforcing Component Amount* | Flexural Modulus (MPa) |
|---|---|---|
| 10 | 13.1% | 7.6 |
| 11 | 19.8% | 13 |
| 12 | 26.6% | 21.5 |

*The Reinforcing Polymer Component Amount is a percentage based on the total weight The formulations of Examples 6–9, which did not contain a reinforcing polymer component, had an insufficient rigidity to form flexure bars, thereby preventing determination of the flexural modulus.

Examples 13–15
Improved Centering According to the Invention

Three types of golf balls were tested after cure to determine the degree of accuracy in concentricity. Measured values included the average shift, maximum shift, and minimum shift, of the mantle from the midpoint of the ball. The standard deviation ("STD") was also calculated.

| Example # | Avg. Shift (mm) | STD (mm) | Max Shift (mm) | Min. Shift (mm) |
|---|---|---|---|---|
| 13 (Conventional) | 0.035 | 0.023 | 0.125 | 0.009 |
| 14 | 0.014 | 0.011 | 0.052 | 0.001 |
| 15 | 0.015 | 0.02 | 0.065 | 0.001 |

Example 13 was a competitor's core prepared with conventional materials, which resulted in a typically off-center ball. Examples 14–15 were prepared using the materials and methods of the present invention, and clearly resulted in a highly improved concentricity.

Examples 16–23
Comparative Spin Rates of Golf Balls

Several conventional golf balls were tested along with several balls prepared according to the invention using a standard driver to determine their spin rates, launch speeds, and compression. The test balls prepared according to the invention all have mantles with 20 PHR Balata, centers having a 1.15 inch diameter, cores having a 1.58 inch diameter, and conventional ionomer covers having a blend of the following DuPont SURLYN® polymers: weight percent DuPont 8320, 40 weight percent DuPont 7940, 10 weight percent DuPont 8660, and 20 weight percent DuPont 8940.

| Ball Type | Spin (rev/min.) | Speed (ft/s) | Compression (Atti gauge) |
|---|---|---|---|
| Conventional Single Layer Ball | 3015 | 159 | 95 |
| Conventional Multi-layer Ball | 2902 | 155 | 76 |
| Mantle of Ex. 5 w/ Center of Ex. 7 | 3204 | 155 | 54 |
| Mantle of Ex. 2 w/ Center of Ex. 7 | 3051 | 159 | 88 |
| Mantle of Ex. 1 w/ Center of Ex. 8 | 2970 | 158 | 84 |
| Mantle of Ex. 4 w/ Center of Ex. 7 | 3130 | 155 | 62 |
| Mantle of Ex. 2 W/ Center of Ex. 8 | 2972 | 158 | 80 |
| Mantle of Ex. 1 w/ Center of Ex. 7 | 3049 | 159 | 91 |

These examples advantageously illustrate that the balls prepared according to the invention have spin and initial speed comparable to, or better than, spin rates and speeds of conventional balls, while at the same time permitting a more cost effective production and easier preparation. The Atti Compression Gauge is commercially available from Atti Engineering Corp. of Union City, N.J.

Examples 24–29
Comparative Spin Rates of Golf Balls

Several additional balls were prepared according to Examples 16–23, and similarly tested using a standard driver to determine their spin rates, launch speeds, and compression.

| Ball Type | Spin (rev/min.) | Speed (ft/s) | Compression (Atti gauge) |
|---|---|---|---|
| Mantle of Ex. 3 w/ Center of Ex. 8 | 2640 | 154 | 67 |
| Mantle of Ex. 4 w/ Center of Ex. 7 | 3366 | 157 | 69 |
| Mantle of Ex. 3 w/ Center of Ex. 7 | 2933 | 157 | 73 |

-continued

| Ball Type | Spin (rev/min.) | Speed (ft/s) | Compression (Atti gauge) |
|---|---|---|---|
| Mantle of Ex. 2 w/ Center of Ex. 9 | 2824 | 154 | 72 |
| Mantle of Ex. 5 w/ Center of Ex. 6 | 3386 | 157 | 63 |
| Mantle of Ex. 1 w/ Center of Ex. 9 | 2705 | 154 | 74 |

These examples further illustrate that the balls prepared according to the invention have spin and initial speed comparable to, or better than, spin rates and speeds of conventional balls, while at the same time permitting a more cost effective production and easier preparation.

It is to be recognized and understood that the invention is not to be limited to the exact configuration as illustrated and described herein. For example, it should be apparent that a variety of suitable materials would be suitable for use in the composition or method of making the golf balls according to the Detailed Description of the Invention. Accordingly, all expedient modifications readily attainable by one of ordinary skill in the art from the disclosure set forth herein are deemed to be within the spirit and scope of the present claims.

What is claimed is:

1. An elastomeric composition comprising a blend or reaction product of:
   a resilient polymer component of at least one polybutadiene having a high molecular weight average and a 1,4-cis content of greater than about 50 weight percent;
   a free-radical initiator; and
   about 1 to 19.8 weight percent of a reinforcing polymer component having a sufficiently low viscosity at a mixing temperature to facilitate mixing of the reinforcing polymer component with the resilient polymer component and having a crystalline melting point sufficiently low to facilitate the mixing while avoiding substantial crosslinking, wherein the uncrosslinked mixture has a flexural modulus of greater than about 3.5 MPa.

2. The composition of claim 1, further comprising a crosslinking agent in an amount sufficient to increase crosslinking between the polymer components.

3. An ellipsoidal article comprising the composition of claim 1.

4. The composition of claim 1, wherein the resilient polymer component has a molecular weight from about 50,000 to 1,000,000.

5. The composition of claim 4, wherein the molecular weight average of the resilient polymer component is from about 250,000 to 750,000.

6. The composition of claim 1, wherein the free-radical initiator is an organic peroxide.

7. The composition of claim 1, wherein the reinforcing polymer component comprises a block copolymer ether/ester, an acrylic polyol, a transpolyisoprene, a transpolybutadiene, a 1,2-polybutadiene, an ethylene-vinyl acetate copolymer, a polyethylene or copolymer thereof, or a cyclooctene.

8. The composition of claim 1, further comprising a crosslinking agent which includes a metallic salt selected from the group consisting of an unsaturated fatty acid, a monocarboxylic acid, and mixtures thereof.

9. The composition of claim 1, wherein the reinforcing polymer component is present in an amount of about 5 to 19.8 weight percent.

10. The composition of claim 1, wherein the composition after being at least partially crosslinked has a loss tangent of less than about 0.15 at −60° C. and less than about 0.05 at 30° C. and a tensile storage modulus of greater than about 100 MPa at −60° C. and greater than about 50 MPa at 30° C., each when measured at 1 Hz and one percent strain.

11. The composition of claim 1, wherein the reinforcing polymer component comprises a crystalline melting temperature of about 35° C. to 120° C.

12. The composition of claim 1, wherein the uncrosslinked composition has a flexural modulus of greater than about 7 MPa.

13. The composition of claim 1, wherein the melting temperature of the reinforcing polymer component differs from a crosslinking temperature of a mixture of reinforcing polymer component and resilient polymer component by about 60° C. to 160° C.

14. The composition of claim 1, wherein the resilient polymer component comprises at least one of polybutadiene, polyisoprene, styrene-butadiene polymer, styrene-propylene-diene rubber, ethylene propylene-diene, or a combination thereof.

15. The composition of claim 1, which further comprises a filler.

16. The composition of claim 15, wherein the filler comprises at least one of zinc oxide, tin oxide, barium sulfate, zinc sulfate, calcium carbonate, barium carbonate, clay, tungsten, tungsten carbide, a silica, cured ground rubber, or a combination thereof, with the filler being present in an amount from about 0.5 to 50 weight percent of the composition.

17. A composition comprising a blend or reaction product of:
   a resilient polymer component of at least one of polyisoprene, styrene-butadiene, styrene-propylene-diene rubber (EPDM), and mixtures thereof;
   a free-radical initiator; and
   a reinforcing polymer component having a sufficiently low viscosity at a mixing temperature to facilitate mixing of the reinforcing polymer component with the resilient polymer component and having a crystalline melting point sufficiently low to facilitate the mixing while avoiding substantial crosslinking, wherein the uncrosslinked composition has a flexural modulus of greater than about 3.5 MPa.

18. The composition of claim 17, wherein the composition after being at least partially crosslinked has a loss tangent of less than about 0.15 at −60° C. and less than about 0.05 at 30° C. and a tensile storage modulus of greater than about 100 MPa at −60° C. and greater than about 50 MPa at 30° C., each when measured at 1 Hz and one percent strain.

19. The composition of claim 17, further comprising a crosslinking agent which includes a metallic salt selected from the group consisting of an unsaturated fatty acid, a monocarboxylic acid, and mixtures thereof.

20. The composition of claim 17, wherein the reinforcing polymer component is present in an amount of about 1 to 40 weight percent of the resilient and reinforcing polymer components.

21. The composition of claim 17, wherein the reinforcing polymer component is present in an amount of about 5 to 25 weight percent of the composition.

22. The composition of claim 17, wherein the reinforcing polymer component comprises a block copolymer ether/ester, an acrylic polyol, a transpolyisoprene, a transpolybutadiene, a 1,2-polybutadiene, an ethylene-vinyl acetate copolymer, a polyethylene or copolymer thereof, or a cyclooctene.

23. A method of preparing an elastomeric composition, comprising the steps of:

proving a resilient polymer component having a 1,4-cis-content greater than about 50 percent;

providing a free radical initiator;

providing a reinforcing polymer component; and mixing the resilient polymer component, the free radical initiator, and about 1 to about 19.8 weight percent of the reinforcing polymer component to provide an uncrosslinked mixture with a flexural modulus greater than about 3.5 MPa.

24. The method of claim 23, wherein the step of providing the resilient polymer component comprises selecting at least one of polybutadiene, polyisoprene, styrene-butadiene, styrene-butadiene polymer, styrene-propylene-diene rubber, ethylene propylene-diene, or mixtures thereof.

25. The method of claim 23, wherein the step of providing the reinforcing polymer component comprises providing at least one of a transpolyisoprene, transpolybutadiene, a block copolymer ether, a block copolymer ester, an acrylic polyol, a polyethylene, a polyethylene copolymer, 1,2-polybutadiene, an ethylene-vinyl acetate copolymer, a cyclooctene, or combinations thereof.

26. The method of claim 23, wherein the step of providing the reinforcing polymer component comprises providing a polymer having a crystalline melting temperature of about 35° C. to 120° C.

27. The method of claim 23, wherein the step of mixing comprises mixing at least about 60 weight percent resilient polymer component by weight of the composition.

28. The method of claim 23, further comprising the steps of:

providing a crosslinking agent;

mixing the crosslinking agent with the resilient polymer component, the free radical initiator, and the reinforcing polymer component.

* * * * *